(No Model.)

A. H. WALKER.
INDICATOR.

No. 588,254. Patented Aug. 17, 1897.

WITNESSES:
Geo. Wadman
Ernest Hopkinson

INVENTOR
Albert H. Walker
BY Edwin H. Brown
his ATTORNEY

THE NORRIS PETERS CO., PHOTO-LITHO., WASHINGTON, D. C.

UNITED STATES PATENT OFFICE.

ALBERT H. WALKER, OF BROOKLYN, NEW YORK.

INDICATOR.

SPECIFICATION forming part of Letters Patent No. 588,254, dated August 17, 1897.

Application filed May 27, 1896. Serial No. 593,235. (No model.)

*To all whom it may concern:*

Be it known that I, ALBERT H. WALKER, of Brooklyn, in the county of Kings and State of New York, have invented a certain new and useful Improvement in Indicators for Showing the Return of Occupants of a House, of which the following is a specification.

My improvement is especially intended for use in boarding-houses for the purpose of indicating the return of the different occupants of a house.

It consists in the combination of a box having openings in one side, a number of slides fitted to protrude more or less through said openings, detents for said slides, and springs for effecting the engagement of the slides with the detents and for moving said slides outwardly when they are released.

Figure 1:
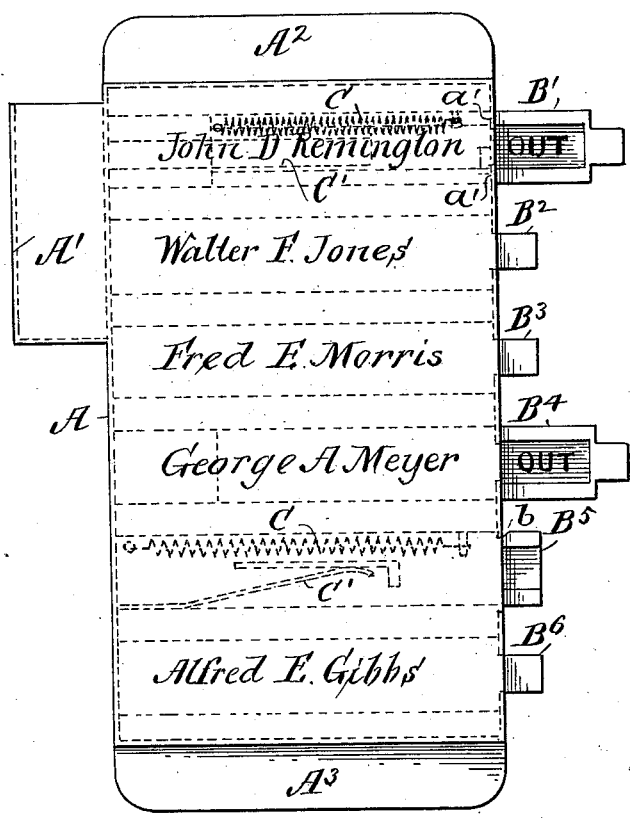
Figure 2:
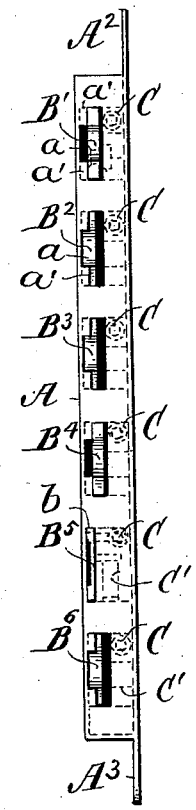
Figure 3:
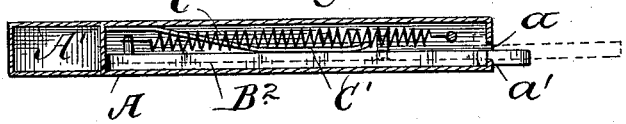

In the accompanying drawings, Figure 1 is a front view of an indicator embodying my improvement, some of the slides being in their innermost and others in their outermost positions. Fig. 3 is a transverse section taken longitudinally of one of the slides. Fig. 2 is a side view of the same.

Similar letters of reference designate corresponding parts in all the figures.

A designates a box, which may be made of sheet metal, and mainly of rectangular form. As here shown, however, it has a side extension A', suitable for holding matches. At the upper end and lower ends it has an extension $A^2$ $A^3$, by which it may be fastened to a wall.

$B'$ $B^2$ $B^3$ $B^4$ $B^5$ $B^6$ designate slides fitted in slideways formed in the box and protruding from one side thereof. In their innermost positions they only protrude enough to be reached by the hand. At other times they protrude much farther, and enough to display the word "Out," or some corresponding word or symbol. In the openings $a$ in the side of the box through which these slides protrude are detents $a'$. As shown in conjunction with the slides $B'$ $B^2$ $B^3$ $B^4$ $B^5$ $B^6$, these detents are made by forming a narrow portion in the openings $a$ and then forming a narrow portion on each of the said slides to form shoulders. Springs applied to said slides tend to move them outward through the openings, and also to move them forward to engage with the detents, so that when these slides are pushed in they will move forward and engage with the detents, engagement being made by the shoulders formed at the junction of the wide or main portions of the slides with their narrow extremities. To cause one of these slides to move outward, it is only necessary to push its protruding end rearward, whereupon the spring with which it is combined will move it outward. To restore it to its normal position, it will be sufficient to move it inward, for the spring will then move it forward to cause it to engage with the detents. Thus it will be seen that the slides are movable longitudinally and are moved into locking position by a lateral movement, and by "lateral" I mean any movement transversely to the longitudinal movement. The slide $B^5$ is somewhat different. Instead of having a narrow outer end it has a notch $b$ in one edge. A spring $C'$ is combined with it which tends to move it upward as well as outward, so that this notch will engage with the top of the opening $a$, through which the slide moves. Otherwise its construction and operation are the same as with the slides $B'$ $B^2$ $B^3$ $B^4$ $B^6$.

On the front of the box, in line with the slides, are the names of the occupants whose return or absence is to be indicated by the slides.

The box and its appurtenances may be made of sheet metal and the slides may be made of cast metal. Thus a very cheap device may be produced.

What I claim as my invention, and desire to secure by Letters Patent, is—

In an indicator, the combination with a box having one or more openings and detents at one side of shouldered slides protruding through said openings, and adapted to move longitudinally and laterally therein, and springs for projecting the slides, substantially as described.

In testimony whereof I have signed my name to this specification in the presence of two subscribing witnesses.

ALBERT H. WALKER.

Witnesses:
ANTHONY GREF,
S. ROBERTS.